United States Patent
Cooke

(10) Patent No.: US 6,401,695 B1
(45) Date of Patent: Jun. 11, 2002

(54) METERING VALVE

(75) Inventor: Michael Peter Cooke, Gillingham (GB)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/645,385

(22) Filed: Aug. 24, 2000

(30) Foreign Application Priority Data

Aug. 27, 1999 (GB) .............................................. 9920206

(51) Int. Cl.⁷ .............................................. F02M 37/04
(52) U.S. Cl. .................. 123/498; 251/129.06
(58) Field of Search ....................... 251/129.01, 129.06; 123/498

(56) References Cited

U.S. PATENT DOCUMENTS

| | | | | |
|---|---|---|---|---|
| 4,617,952 A | * | 10/1986 | Fujiwara et al. .............. | 137/85 |
| 5,343,894 A | * | 9/1994 | Frisch et al. ............ | 137/625.65 |
| 5,460,202 A | * | 10/1995 | Hanley et al. ......... | 251/129.06 |
| 5,669,416 A | * | 9/1997 | Nusche .................. | 251/129.06 |
| 5,779,218 A | * | 7/1998 | Kowanz ................ | 251/129.06 |
| 5,857,491 A | * | 1/1999 | Cooke .................. | 251/129.06 |
| 6,173,744 B1 | * | 1/2001 | Frisch et al. ........... | 251/129.06 |
| 6,220,295 B1 | * | 4/2001 | Bouchard et al. ...... | 251/129.06 |
| 6,257,548 B1 | * | 7/2001 | Hiddessen et al. ..... | 251/129.06 |

* cited by examiner

Primary Examiner—Thomas N. Moulis
(74) Attorney, Agent, or Firm—Thomas A. Twomey

(57) ABSTRACT

A metering valve for metering fuel flow, the valve having a flow rate control member moveable along an axis to control the rate of flow of metered fuel through the valve, and a piezo-electric bending device bendable in response to a control signal so as to cause the flow rate control member to move a desired distance in a selected direction along the axis.

9 Claims, 1 Drawing Sheet

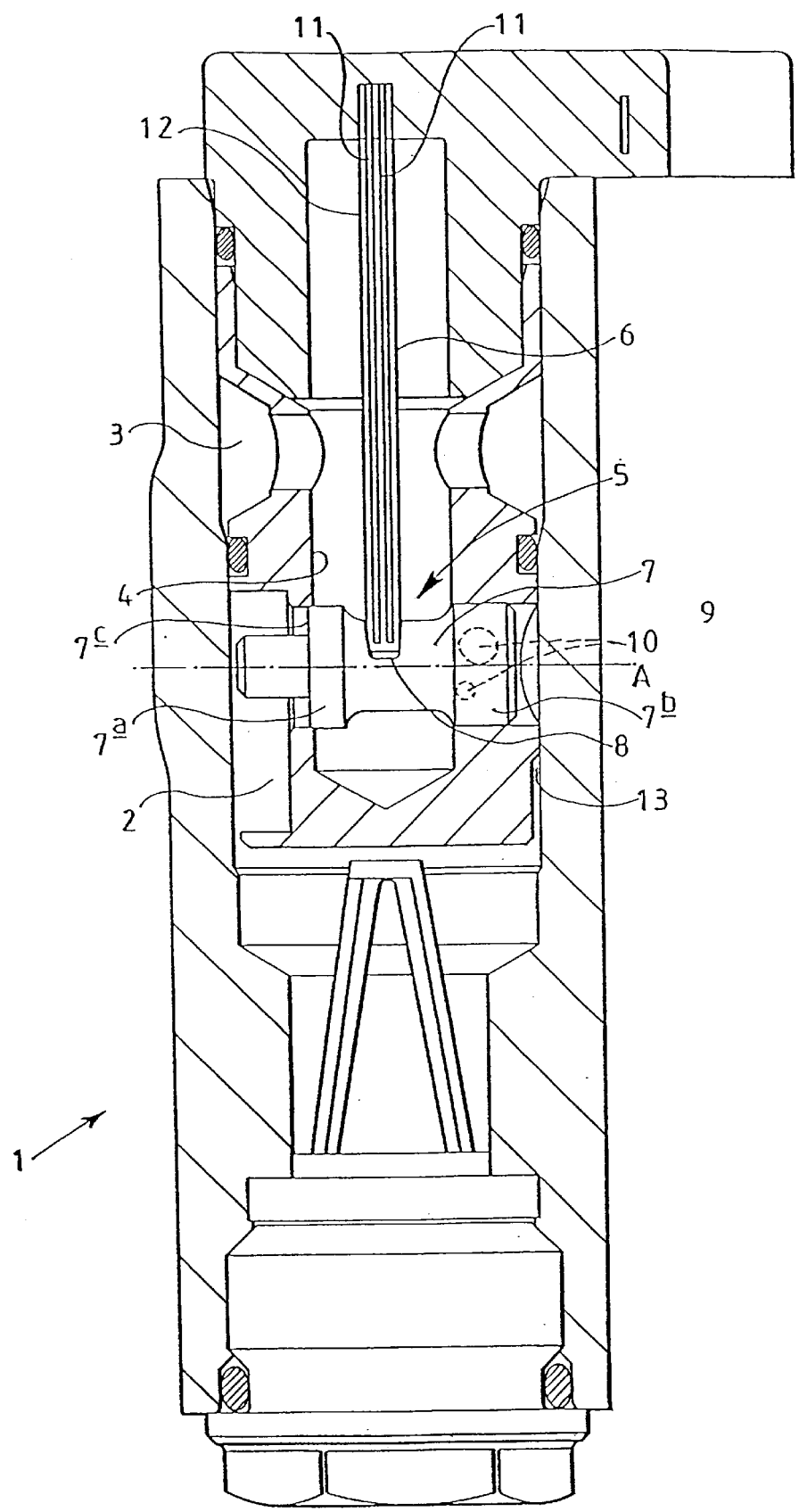

METERING VALVE

TECHNICAL FIELD

This invention relates to a metering valve suitable for use in metering fuel flow in an internal combustion engine fuel supply system.

BACKGROUND OF THE INVENTION

It is an object of the invention to provide a piezo-electrically controlled metering valve for metering fuel flow in an internal combustion engine fuel supply system.

DESCRIPTION OF THE PREFERRED EMBODIMENT

According to the present invention there is provided a metering valve for metering fuel flow, the valve having a flow rate control member moveable along an axis to control the rate of flow of metered fuel through the valve, and a piezo-electric bending device bendable in response to a control signal so as to cause the flow rate control member to move a desired distance in a selected direction along the axis. The valve can conveniently be used in a piezo-electrically controlled injector system, whereby similar or common drive circuitry can be used for the injectors and the metering valve in an electronic control unit. The valve also facilitates the provision of a more compact and power efficient fuel supply system.

The metering valve is particularly suitable for use in metering fuel flow in an internal combustion engine fuel supply system.

Conveniently, the bending device comprises at least one piezo-electric bending element sleeved in elastomeric material. In this manner, the or each piezo-electric element is protected from potentially damaging effects of aggressive fuel which passes through the valve. Furthermore, the or each element is mechanically cushioned by the elastomeric material. Also, where the bending device is connected to other system components, the effects of backlash between the bending device and the other components can be mitigated or eliminated.

The bending device may be elongate, and have an axis extending obliquely to the axis along which the flow rate control member is moveable.

An end portion of the bending device may be located in a recess in the flow rate control member's body.

The invention also includes a high pressure fuel pump having the metering valve installed in its inlet.

Preferably, a portion of the flow rate control member is disposed within a damper chamber having an associated flow restrictor, the damper chamber and the flow restrictor being arranged to limit the effect of pressure fluctuations on the position of the flow rate control member, in use.

The invention also relates to a fuel injector system comprising a piezo-electrically controlled fuel injector and a metering valve as herein described, and further comprising common or similar drive circuitry arranged to control operation of the fuel injector and the metering valve.

In order that the invention may be better understood, an embodiment thereof, which is given by way of example only, will now be described with reference to the accompanying drawing, which shows part of a high pressure fuel pump having a metering valve installed in its inlet.

The high pressure pump 1 shown in FIG. 1 has a main inlet passage 2 an outlet 3 and a main bore 4 interconnecting the inlet passage 2 and the outlet 3.

A metering valve, shown generally as 5, is installed in the main bore 4 and inlet passage 2 of the pump 1. The metering valve 5 comprises a piezo-electric bending device 6 and a flow rate control member in the form of a spool 7. An upper end of the bending device 6 as shown in FIG. 1 is located in a recess of the pump at one end of the main bore 4. A lower end of the bending device 6 as shown in FIG. 1 is located in a recess 8 in the spool 7. A main metering portion 7a of the spool 7 is disposed in a correspondingly shaped portion of the inlet passage 2. A secondary metering portion 7b of the spool 7 is disposed in a correspondingly shaped bore defining a damper chamber 9 described in greater detail below. Secondary ports 10 in the body of the pump 1 communicate with the bore defining the damper chamber 9. The ports 10 are closed with the spool 7 in the position shown in FIG. 1. The ports 10 are arranged to open, at their ends remote from the ends closed by the spool 7, into the inlet passage 2.

In use, the bending device 6 is supplied an electrical signal from an electronic control unit, causing the lower end portion of the bending device 6 as shown in FIG. 1 to be deflected so as to have a component of movement along an axis A. The spool 7 is thereby moved a desired amount in a selected direction along the axis A. Moving the spool 7 to the right as shown in FIG. 1 tends to increase metered fuel flow through the inlet passage 2 into the main bore 4 by increasing the spacing of a metering edge 7c of the spool 7 from the wall defining the main bore 4. The movement also causes a secondary metered flow of fuel through one or more of the secondary ports 10 into the main bore 4 as they are (partially) uncovered by the spool 7. The signal can be varied to provide an infinitely variable metered flow into the pump, the signal value being selected, in use, to correspond to a predetermined metered flow value.

The size and position of the secondary ports 10 can be adjusted, when designing a metering valve for a particular purpose, to obtain a desired relationship between total metered flow and spool position.

The bending device 6 in the exemplary metering valve 5 comprises two piezo-electric bender elements 11 moulded into an elastomeric sleeve 12. The sleeve 12 protects the elements 11 from the adverse effects of fuels passing through the pump, and provides mechanical cushioning with backlash elimination where the bending device 6 engages in the recess 8.

The damper chamber 9 communicates via a flow restrictor 13 with fuel upstream of the main bore 4. The undesirable effects of pressure fluctuations on the spool position can be reduced by the damping effect caused by the resistance to movement through the flow restrictor of fuel disposed in the chamber 9 between the secondary end of the spool 7 (the right hand end as shown in FIG. 1) and the flow restrictor 13.

The metering valve 5 described above facilitates the provision of rapid and accurate fuel flow rate adjustment with reliable and cost effective electronic control.

What is claimed is:

1. A metering valve for metering fuel flow, the valve having a flow rate control member moveable along an axis to control the rate of flow metered fuel through the valve, and a piezo-electric bending device bendable in response to a control signal so as to cause the flow rate control member to move a desired distance in a selected direction along the axis, wherein a portion of the flow rate control member is disposed within a damper chamber having an associated flow restrictor.

2. The metering valve as claimed in claim 1, wherein the bending device comprises at least one piezoelectric bending element.

3. The metering valve as claimed in claim 2, wherein the at least one piezo-electric bending element is sleeved in elastomeric material.

4. The metering valve as claimed in claim 1, wherein the bending device is of elongate form and has a further axis extending obliquely to the axis along which the flow rate control member is moveable.

5. The metering valve as claimed in claim 1, wherein the flow rate control member has a control member body, an end portion of the bending device being located in a recess provided in the control member body.

6. The metering valve as claimed in claim 1, wherein the flow rate control member takes the form of a spool.

7. A high pressure fuel pump comprising a metering valve as claimed in claim 1, the metering valve being installed in an inlet of the high pressure fuel pump.

8. The high pressure fuel pump as claimed in claim 7, wherein the damper chamber and the flow restrictor being arranged to limit the effect of pressure fluctuations on the position of the flow rate control member, in use.

9. A fuel injector system comprising a piezo-electrically control fuel injector and a metering valve and drive circuitry arranged to control operation of the fuel injector and the metering valve, the valve having a flow rate control member moveable along an axis to control the rate of flow metered fuel through the valve, and a piezo-electric bending device bendable in response to a control signal so as to cause the flow rate control member to move a desired distance in a selected direction along the axis.

* * * * *